Feb. 25, 1941.    H. S. BIMPSON    2,232,936
EXPANSION JOINT
Filed May 2, 1940    2 Sheets-Sheet 1

Inventor
H. S. Bimpson
by
Attorney

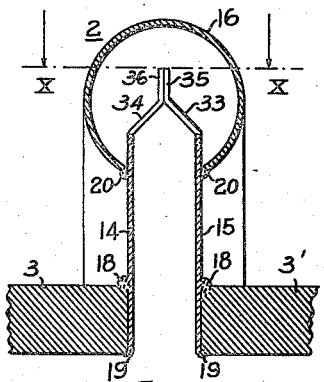
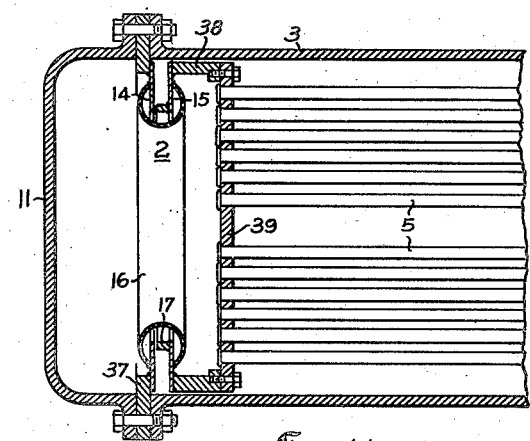
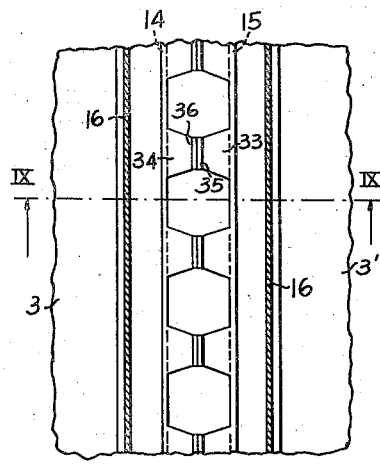
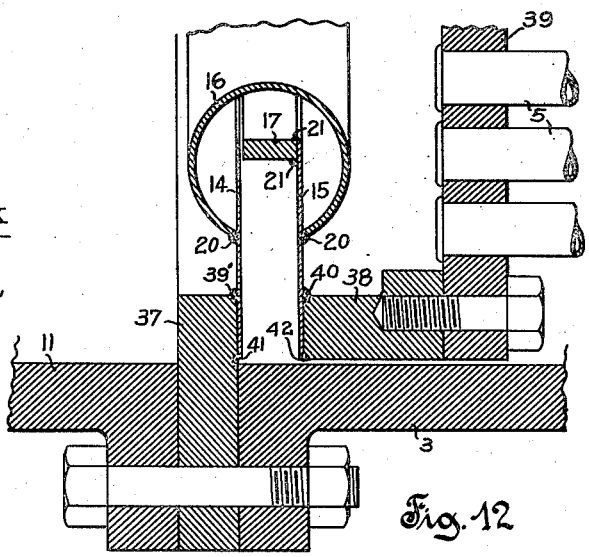

Patented Feb. 25, 1941

2,232,936

UNITED STATES PATENT OFFICE 2,232,936

EXPANSION JOINT

Henry S. Bimpson, West Allis, Wis., assignor to Allis-Chalmers Manufacturing Company, Milwaukee, Wis., a corporation of Delaware Application May 2, 1940, Serial No. 332,879

15 Claims. (Cl. 285—111)

The invention herein disclosed relates to a new and improved expansion joint to be used in connection with heat exchangers or other structures wherein an expansion or contraction between two parts due to a change in temperature or other causes may be great enough to set up excessive stresses. For example, the difference in expansion or contraction between the casing and the tubes of a condenser due to heating and cooling is considerable and an expansion joint is necessary to relieve excessively high stresses that would ordinarily be set up.

Heretofore expansion joints have been unsatisfactory because in many instances failure occurred at the expansion joint. This was sometimes due to welds being placed under severe tensile stresses. The expansion joint of the invention herein disclosed is so constructed as to have the peripheral welds thereof subjected only to compressive stresses, thereby eliminating a very objectionable feature. Furthermore, in previous expansion joints the amount of expansion or contraction allowable was very limited and in many cases a plurality of expansion joints was necessary in order to allow for the required amount of expansion or contraction. The increased flexibility of the expansion joint herein disclosed will reduce the number of expansion joints required and will consequently greatly reduce the cost. Further features of the expansion joint of this invention are its simplicity, ruggedness and reduced cost of manufacture.

The expansion joint herein disclosed consists of two annular deflectable plates attached to adjacent ends of sections of the expansible structures, and an endless tube slit on its periphery and attached to the deflectable plates so as to seal the space between them. Spacing means are located between the plates and attached to at least one of them at its sealed edge.

It is an object of this invention to provide an expansion joint capable of permitting a large amount of movement in all directions and so simple in construction as to greatly reduce the cost of manufacture.

It is another object of the invention to provide an expansion joint comprising welds which are subjected only to compressive stresses, thereby reducing the possibility of failure.

It is another object of this invention to provide an expansion joint comprising two deflectable plates spaced by means attached to at least one of the plates at its periphery and an endless tube slit on its inner periphery and sealingly connecting the two deflectable plates.

In the drawings appended hereto for purposes of illustration:

Fig. 9 is an enlarged fragmentary sectional view of a modified form of the improved expansion joint;

Fig. 10 is a developed transverse section of Fig. 9 taken on the line X—X;

Fig. 11 is a longitudinal fragmentary sectional view of a condenser showing the tube sheet and main casing connected by means of an internally disposed expansion joint; and Fig. 12 is an enlarged fragmentary sectional view of the improved expansion joint as illustrated in Fig. 11.

Figure 1:
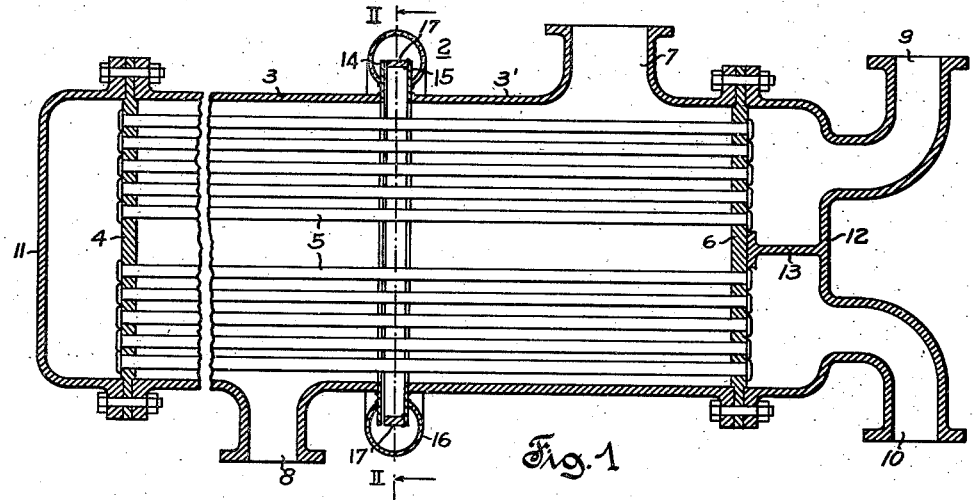
Fig. 1 is a longitudinal sectional view of a condenser employing the improved type of expansion joint.
Figure 2:
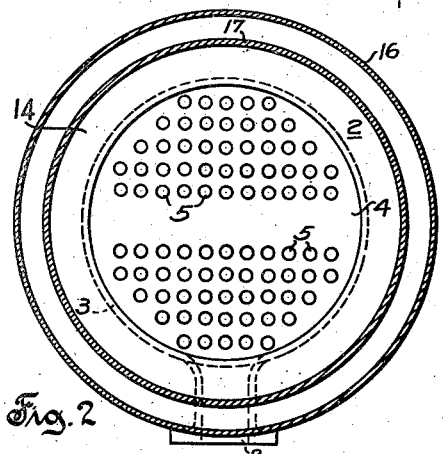
Fig. 2 is a transverse section of Fig. 1 taken on line II—II.

Figs. 1 and 2 illustrate a surface condenser equipped with the improved expansion joint 2. The condenser comprises a main casing comprising sections 3 and 3' and having an exhaust steam inlet 7 and a condensate removal opening 8; a plurality of heat transferring tubes 5 supported by tube sheets 4 and 6; an end head 11 fixed at one end of the condenser and an end head 12 located at the other end of the condenser having a cooling medium inlet opening 9, a cooling medium outlet opening 10 and a partition 13 to divert the flow of the cooling medium through the tubes 5; and an expansion joint 2 fixed between adjacent faces of casing sections 3 and 3'.

Figures 3, 5:
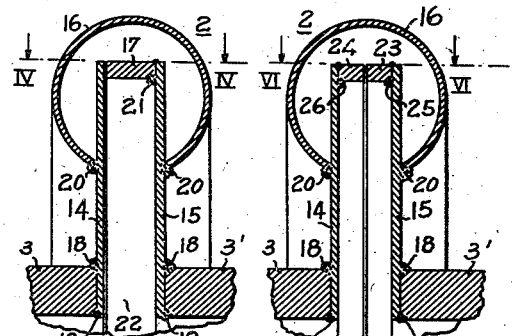
Fig. 3 is an enlarged fragmentary cross-sectional view of one of the improved expansion joints applied to the exterior of a condenser casing.
Fig. 5 is a view similar to Fig. 3 but showing a modified construction.
Figures 4, 6:
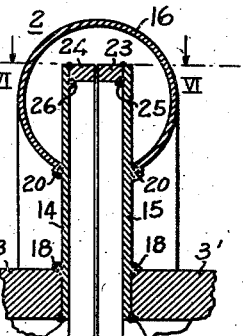
Fig. 4 is a developed transverse section of Fig. 3 taken on line IV—IV.
Fig. 6 is a developed transverse section of Fig. 5 taken on the line VI—VI.

The expansion joint 2 shown in Figs. 1 and 2 is more clearly illustrated in the enlarged fragmentary views shown in Figs. 3 and 4 and consists of two deflectable circular plates 14 and 15 which are securely attached to the condenser casing sections 3 and 3' as by means of welded joints 18 and 19; a continuous ring 17, occupying the space between plates 14 and 15, and attached to plate 15 at its outer periphery as by means of weld 21; and a circular tube 16, provided with a slit at its inner periphery, is placed around the plates 14 and 15 and securely attached thereto by means of welds 20. The plates 14 and 15 preferably extend within tube 16 a distance approximating one-half the diameter of tube 16.

From the description and illustrations it is readily seen that any difference in expansion between the condenser casing 3, 3' and the heat transferring tubes 5 will cause the adjacent end portions of casing sections 3 and 3' to move relative to each other. The plates 14 and 15 and tube 16, which are deflectable, will allow for this relative movement. The circular ring 17 acts as a fulcrum for the plates 14 and 15, and any increase in the space 22 between the ends of sections 3 and 3' will tend to increase the diameter of the tube 16 and will induce a compressive stress in the welds 20. The tube 16 is originally slotted on its inner periphery but the opening is narrower than the space 22. In the construction of the expansion joint, the walls forming the slot in the tube 16 are forced apart to allow the introduction of the plates 14 and 15 separated by the spacer ring 17. Since the walls of tube 16 at the edges of the slot are urged toward each other due to the above construction, the welds 20 will at all times be under a compressive stress regardless of an increase or decrease in the opening 22. It will be noted that most of the relative movement between adjacent edges of sections 3 and 3' is taken up by deflection of plates 14 and 15, the tube 16 serving as a closure for the space between plates 14 and 15, and further serving as a pivot for the outer edges of the plates.

Figs. 5 and 6 illustrate a slight modification of the expansion joint 2 shown in Figs. 3 and 4. Instead of a single spacer ring 17 as shown in Figs. 3 and 4, two circular rings 24 and 23 are welded to plates 14 and 15, respectively. Ring 24 is securely attached to plate 14 by weld 26 and ring 23 is attached to plate 15 by welds 25. Ring 24 abuts ring 23 and will allow a relative sliding movement in a transverse direction, in case sections 3 and 3' are not in perfect axial alinement.

Figure 7:
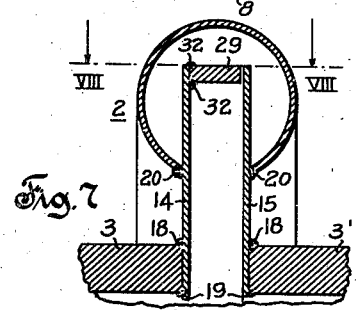
Fig. 7 is a view similar to Fig. 3 but showing a further modified construction.
Figure 8:
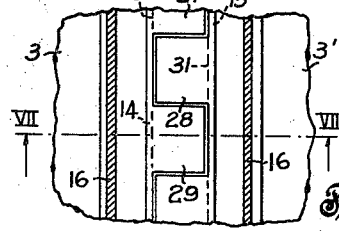
Fig. 8 is a developed transverse section of Fig. 7 taken on the line VIII—VIII.

Figs. 7 and 8 illustrate another modification of the expansion joint 2. In this case the edges of plates 14 and 15 are separated by segments of a circular ring, these segments being welded alternately to plates 14 and 15. Referring to Fig. 8, 29 is a spacer block welded to plate 14 at 32, another segment of a circular ring 28 is welded to plate 15 at 31, and 27 is another spacer welded to plate 14 at 30. This construction continues around the complete periphery of plates 14 and 15.

Figs. 9 and 10 illustrate a still further modification of the expansion joint shown in Figs. 3 and 4, and show still another means for spacing of plates 14 and 15. In this modified expansion joint the outer periphery of the plates 14 and 15 is formed into tooth-shaped segments deflected toward each other, as shown in Fig. 10. In plate 14 a portion 34 of the tooth is bent at an angle toward plate 15. At the extreme end of the tooth a portion 36 is bent parallel to plate 15. In plate 15 a portion 33 is bent toward plate 14 and a portion 35 is bent parallel to plate 14. These teeth are of the same shape and portion 36 of plate 14 abuts against the portion 35 of plate 15. In this manner spacing between the peripheries of plates 14 and 15 is provided.

Figs. 11 and 12 illustrate in partial section a condenser provided with an internal expansion joint located between the main condenser casing 3 and the movable tube sheet 39. The movable tube sheet 39 is provided with an annular supporting collar 38 and an annular plate 37 is secured between the condenser casing 3 and the end head 11. The collar 38 and the plate 37 are spaced apart to allow the installation of the expansion joint 2. Plate 14 is rigidly secured to the annular plate 37 by means of welds 39' and 41 and plate 15 is rigidly secured to collar 38 by means of welds 40 and 42. Spacer ring 17 is secured by welds 21 to the plate 15 at its inner periphery. The tube 16 is slotted at its outer periphery and sealingly connects the two plates 14 and 15 and is secured thereto by welds 20. The tube sheet 39 and the collar 38 are slidably associated with the casing 3. Any difference in expansion or contraction between tubes 5 and condenser casing 3 will be taken care of by the expansion joint 2.

From the foregoing description it will be apparent that the improved expansion joint will permit a large amount of relative expansion between the elements connected by the deflectable plates. The combined allowable deflection of the two plates and the endless tube will permit a large amount of expansion or contraction. Since the two deflectable plates are not connected together other than by the endless tube, a relative movement in any direction is possible between the two connected elements without danger of rupture. While welded joints are utilized throughout in illustrations herein described, it will be understood that other types of connections may be employed without deviating from the present invention.

It should be understood that it is not desired to limit the invention to the exact details of construction herein shown and described, for various modifications within the scope of the invention and the claims appended hereto may occur to those skilled in the art.

It is claimed and desired to secure by Letters Patent:

1. An expansion joint connecting two adjacent members to permit relative movement between adjacent end portions of said members comprising flexible plates rigidly attached to each of said end portions and extending therefrom in substantially parallel planes and a toroidal shaped structure enclosing and sealing said extending portions of said plates.

2. An expansion joint connecting two adjacent members to permit relative movement between adjacent end portions of said members comprising flexible plates rigidly attached to each of said end portions and extending therefrom in substantially parallel planes, means for spacing said extending portions of said plates and a toroidal shaped structure enclosing and sealing said extending portions of said plates.

3. In a sealed expansion joint a pair of elements having relatively movable adjacently spaced end portions, a deflectable plate rigidly attached to each of said end portions, and a hollow resilient tubelike structure sealing the space between said deflectable plates.

4. In a sealed expansion joint a pair of elements having relatively movable adjacently spaced end portions, a deflectable plate rigidly attached to each of said end portions, spacing means provided between the free peripheries of said deflectable plates and a hollow resilient tube-like structure sealing the space between said deflectable plates.

5. In a sealed expansion joint a pair of elements having relatively movable adjacently spaced portions, a deflectable plate rigidly attached to each of said portions, and a hollow toroid sealing and surrounding the peripheries of said deflectable plates.

6. In a sealed expansion joint a pair of elements having relatively movable adjacently spaced circular end portions, a circular deflectable plate rigidly attached concentrically with each of said end portions, spacer blocks attached rigidly to at least one of said plates at its periphery for maintaining minimum space relationship between said plates, and a hollow toroid enclosing and sealing the peripheral portions of said plates.

7. In an expansion joint a pair of elements having relatively movable, adjacently spaced end portions, deflectable plates attached concentrically with each of said end portions and extending therefrom in substantially parallel planes, spacing means between said plates, and an annular tubular member connecting and sealing said deflectable plates, the diameter of said tube being substantially greater than the space between the said end portions.

8. In an expansion joint a pair of elements having adjacently spaced portions, deflectable plates attached concentrically to each of said portions, spacing means between said plates, the periphery of each plate being free to move with respect to the periphery of the other plate, and an endless tubular element enclosing the peripheral portions of said plates, said plates protruding within said tubular element a distance approximately one-half the diameter of said tubular element.

9. In a sealed expansion joint a pair of elements having relatively movable adjacently spaced portions, a deflectable plate rigidly attached to each of said portions, each of said deflectable plates having its outer periphery tooth shaped, said tooth shaped outer peripheries being deflected into contact with each other to provide spacing means for said deflectable plates, and a hollow toroid surrounding and sealing the peripheral portions of said deflectable plates and the space between them.

10. In a sealed expansion joint a pair of elements having relatively movable adjacently spaced portions, a deflectable plate rigidly attached to each of said portions, circular rings attached to each of said deflectable plates at their outer peripheries so as to abut against each other and thereby form spacing means for said deflectable plates, and a hollow toroid surrounding and sealing the peripheral portions of said deflectable plates and the space between them.

11. A sealed expansion joint between two relatively movable members comprising two parallel annular plates, each plate being rigidly connected at an edge thereof to one of said members, and a toroidal member enclosing the free edges of said plates and circumferentially sealed to said plates at a radial distance from said free edges.

12. A sealed expansion joint between two relatively movable annular members comprising an annular plate rigidly connected at its outer periphery to each of said members, said plates being parallel to each other, and a toroidal member enclosing the inner peripheries of said plates and in sealing engagement therewith.

13. An expansion joint comprising two parallel, flexible annular disks, and a toroidal member enclosing the peripheral portions of said disks and in sealing engagement with each of said disks.

14. An expansion joint as defined in claim 13, said toroidal member being resilient, and the walls thereof being yieldingly urged into contact with said disks by the inherent resilience of said member.

15. An expansion joint as defined in claim 13 and spacing means between and supported by said peripheral portions of said disks.

HENRY S. BIMPSON.